(12) United States Patent
Shivanandan

(10) Patent No.: US 6,222,187 B1
(45) Date of Patent: Apr. 24, 2001

(54) MULTIWAVELENGTH IMAGING AND SPECTROSCOPIC PHOTOEMISSION MICROSCOPE SYSTEM

(75) Inventor: Kandiah Shivanandan, Bethesda, MD (US)

(73) Assignee: Institute of Microelectronics, Singapore (SG)

( * ) Notice: Subject to any disclaimer, the term of this patent is extended or adjusted under 35 U.S.C. 154(b) by 0 days.

(21) Appl. No.: 09/109,619

(22) Filed: Jul. 2, 1998

(30) Foreign Application Priority Data

Jul. 3, 1997 (SG) .................................................. 9702355

(51) Int. Cl.$^7$ .................................. G01J 3/18; G01J 3/02
(52) U.S. Cl. ............... 250/330; 250/339.05; 250/339.07; 359/353; 359/355; 359/351
(58) Field of Search ..................................... 250/330, 332, 250/338.1, 339.01, 339.05, 339.07; 358/51; 359/350, 353, 351, 355

(56) References Cited

U.S. PATENT DOCUMENTS

| | | | |
|---|---|---|---|
| 4,680,635 | * | 7/1987 | Khurana . |
| 4,755,874 | * | 7/1988 | Esrig et al. . |
| 4,877,960 | * | 10/1989 | Messerschmidt et al. . |
| 5,192,980 | * | 3/1993 | Dixon et al. . |
| 5,220,403 | * | 6/1993 | Batchelder et al. . |
| 5,239,409 | * | 8/1993 | Doyle et al. ......................... 359/351 |
| 5,329,352 | * | 7/1994 | Jacobsen . |
| 5,865,829 | * | 2/1999 | Kitajima ................................... 606/3 |
| 6,121,616 | * | 9/2000 | Trigg ............................... 250/339.07 |

FOREIGN PATENT DOCUMENTS

| | | | |
|---|---|---|---|
| 0 345 773 A2 | * | 12/1989 | (EP) . |
| 0 426 040 A1 | * | 5/1991 | (EP) . |
| 2 299 402 | * | 10/1996 | (GB) . |

* cited by examiner

Primary Examiner—Constantine Hannaher
Assistant Examiner—Albert Gargioaroi
(74) Attorney, Agent, or Firm—Proskauer Rose LLP

(57) ABSTRACT

A multiwavelength imaging and spectroscopic photoemission microscope system (100) which simultaneously provides images in a broad range of the electromagnetic spectrum, such as between 200 nm–1000 nm (optical or visible light) and 1000 nm–500 nm (infrared light). The multiwavelength imaging and spectroscopic photoemission microscope system comprises a microscope (102), a spectrometer (106), a beam splitter (108), a first spectrum focal plane array (110) including an appropriate photodiode (114A), a second spectrum focal plane array (120) including an appropriate photodiode (114B), and a cryogenic vessel (160) to maintain relevant portions of the system at a very low temperature. The invention may be used in failure analysis of integrated circuits and in semiconductor and low temperature physics.

8 Claims, 1 Drawing Sheet

MULTIWAVELENGTH IMAGING AND SPECTROSCOPIC PHOTOEMISSION MICROSCOPE SYSTEM

RELATED PATENT

The subject matter of this patent application is related to the subject matte closed in U.S. Pat. No. 5,302,830 ("the '830 patent"), entitled "Method for Measuring Thermal Differences In Infrared Emissions From Microdevices" issued to Kandiah Shivanandan on Apr. 12, 1994. The contents of that patent are incorporated herein by reference.

BACKGROUND OF THE INVENTION

1. Field of the Invention

The present invention relates to multiwavelength imaging and a spectroscopic photoemission microscope system. In particular, the present invention relates to a multiwavelength imaging and spectroscopic photoemission microscope system which may simultaneously provide images in a broad range of the electromagnetic spectrum, such as between 200 nm–1000 nm (ultraviolet and visible light) and 1000 nm–2500 nm (infrared light). The present invention may be used in failure analysis of integrated circuits and in semiconductor and low temperature physics.

2. Discussion of Related Art

It is known that certain physical phenomena, occurring within microdevices such as semiconductor devices, contribute to degradation of the device's performance under various operating conditions. Such phenomena are known to occur, for example, within insulatedgate field-effect transistors (IGFETs), metal oxide semiconductor field-effect transistors (MOSFETs), and virtually all semiconductor devices containing p-n junctions.

One type of phenomena which may contribute to degradation in the performance of MOSFETs is the emission of hot electrons from the MOSFET's silicon substrate into the gate insulator layer under various bias conditions. See generally, P. Correll, R. Troutman, and T. Ning, "Hot-Electron Emission in N-Channel IGFET's", IEEE Trans. on Electron Devices, Vol. ED-26, pp. 520–33 (1979). It is believed that the resulting substrate current may, in turn, overload the substrate-bias voltage, causing substrate potential fluctuations or electron injection into the substrate, inducing snap-back breakdown and CMOS latchup. Another type of phenomena causing degradation in MOSFET performance is believed to be caused by electron trapping in the oxide. Id.

It is known that certain physical phenomena contribute to breakdown across a p-n junction upon the application of a forward or reverse bias. See generally, A. Chynoweth and K. McKay, "Photon Emission from Avalanche Breakdown in Silicon", Phys. Rev., Vol. 102, pp. 369–76 (1956). In many cases, such breakdown is undesirable.

The occurrence of these and other undesirable physical phenomena within semiconductor devices are known to be accompanied by the emission of electromagnetic radiation. For example, photon emission spectrum characteristics resulting from latchup and hot electrons in n-channel MOSFETs have been measured in the visible spectrum. See, e.g., T. Aoki and A. Yoshii, "Analysis of Latchup-Induced Photoemission", IEDM Technical Digest 89–281, pp. 281–84 (1989). Moreover, emission spectrum characteristics from forward and reversed biased p-n junction diodes have also been measured in the visible spectrum. See, A. Chynoweth and K. McKay, "Photon Emission from Avalanche Breakdown in Silicon", Phys. Rev., Vol. 102, pp. 369–76 (1956). These emissions are believed to be generated by Bremsstrahlung radiation, i.e, broad band radiation emission when an energetic electron is decelerated in an electric field.

It is highly desirable to measure the electromagnetic radiation emitted from semiconductors to determine whether the aforementioned and other undesirable phenomena contributing to degradation of performance are occurring or may occur under certain operating conditions. It is also desirable to locate spatially from within the microdevice where the radiation is emitted. Detections of such radiation emission, by measuring the "thermal signature" of the device, can form the basis for testing failure mechanisms in semiconductor devices, and can be used to detect defects in individual semiconductors or locate problems in various manufacturing processes. Moreover, such measurement can be utilized to predict failures in semiconductors and to improve overall design.

Most failures of semiconductor devices will be accompanied by abnormal thermal signatures, e.g., some devices might become very hot while some might never turn on when powered up. The change in thermal signature due to the failure mechanism, however, may be difficult to view, due to operating temperature, small thermal gradient, or small device size.

In the past, measurements of such electromagnetic radiation emissions from semiconductors have been performed in the optical spectrum. This basic technology has now evolved into photoemission microscopy and is being used in industry in testing failure mechanisms in semiconductor devices.

It is desirable, however, to measure radiation emissions in other wavelengths of the electromagnetic spectrum. This provides a more complete spectral analysis of the emitted radiation and thermal signatures in semiconductor devices that result from failure mechanisms, thus providing additional test data. Moreover, certain undesirable phenomena produce infrared radiation, but do not generate radiation in the visible spectrum. Therefore, detection of such phenomena cannot be accomplished using measurements limited solely to the visible spectrum.

The device described in the '830 patent is configured to detect infrared radiation only. It is desirable, however, to detect simultaneously a wide band of electromagnetic energy emitted by an IC device in the visible and infrared spectra.

Therefore, it is an object of the present invention to provide a spectroscopic and photometric imaging photoemission microscope which images a wide band of energy wavelengths, such as the visible spectrum to the infrared spectrum.

SUMMARY OF THE INVENTION

This and other objects of the present invention are provided by a multiwavelength photometric and spectroscopic imaging photoemission microscope system which may provide a wide spectrum of electromagnetic emissions from an IC device. The system comprises a microscope, a visible/infrared (IR) spectrometer, a visible and an infrared focal plane array, a filter assembly, and a cryogenic vessel to maintain relevant portions of the system at a low temperature.

In a preferred embodiment, the system includes a microscope which has a number of visible and infrared spectra objective lenses. Light passing through the visible and infrared objective lenses is first transmitted through the spectrometer for spectral measurements with a series of gratings and order sorting filters in the visible and infrared spectra. The light then passes to a beam splitter where the visible and infrared wavelengths are transmitted to their respective focal plane arrays via selected uncooled visible filters and cooled infrared filters. The focal plane arrays include an IR photodiode and an optical CCD, respectively, which convert the visible and infrared light into digitized signals for image display. A liquid nitrogen dewar is provided to cool the infrared subcomponents and both the focal plane arrays for maximum sensitivity and optimum performance of the system under low infrared background noise.

The inventive system allows a device being tested to have a broad spectrum of electromagnetic radiation emissions, such as infrared and visible light, imaged simultaneously.

BRIEF DESCRIPTION OF THE DRAWING

The present invention is described with reference to the following figure: The sole figure is a cross-sectional view of a device according to a preferred embodiment of the present invention.

DETAILED DESCRIPTION OF A PREFERRED EMBODIMENT

Figure 1:
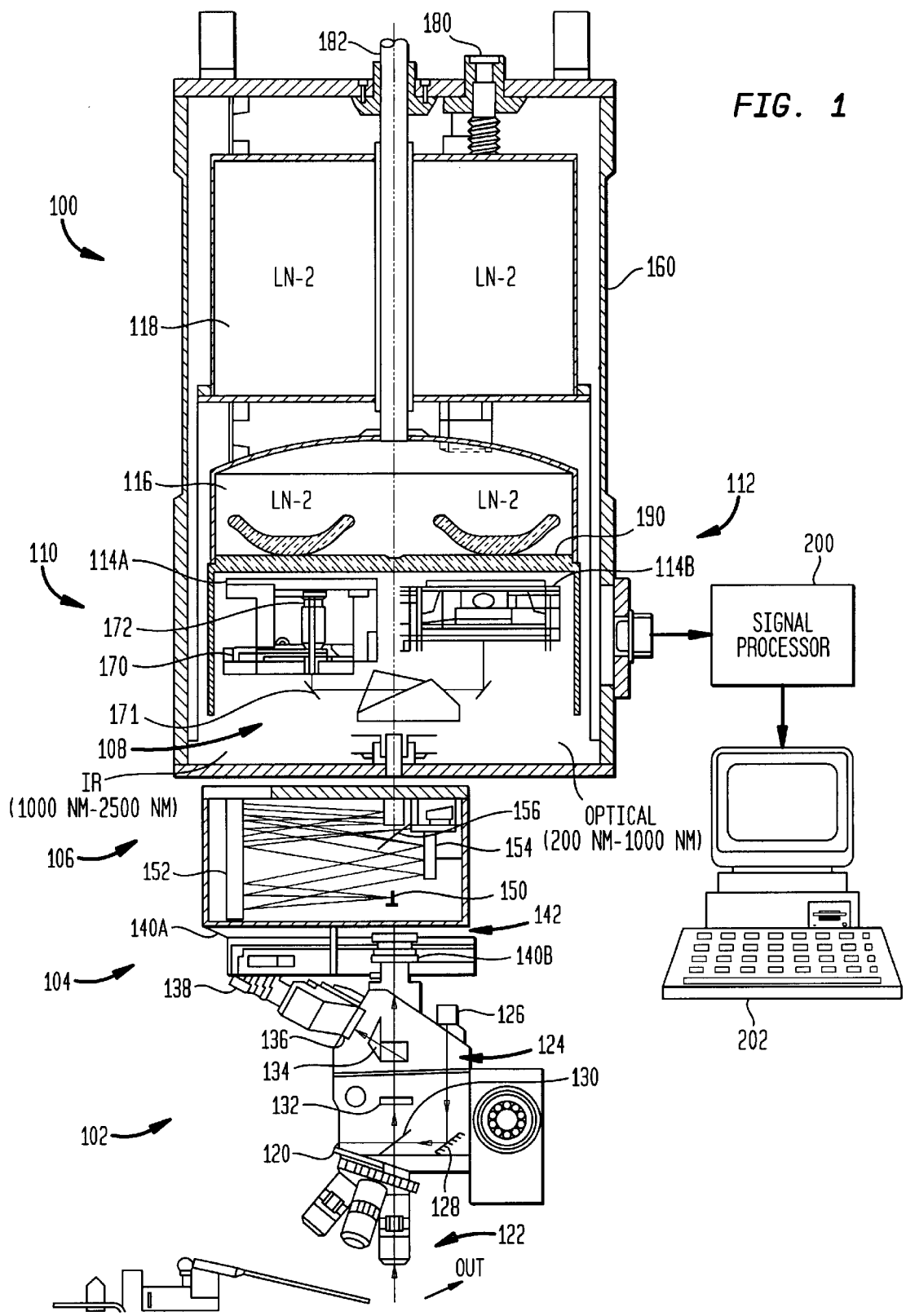

FIG. 1 is a cross-sectional view of a preferred embodiment of an imaging and photometric spectroscopic photoemission microscope system 100 according to the present invention. The system 100 comprises a microscope 102, an optical filter assembly 104, a spectrometer 106, a beam splitter 108, two focal plane arrays 110, 112 and a cryogenic vessel, such as a dewar case 160, with two cryogenic containers 116, 118. Each of these elements is described below in greater detail.

The Microscope

The microscope 102 includes a turret assembly 120 of visible and infrared objective lenses 122 and a light source assembly 124, comprising a light source 126, a mirror 128, and a half mirror 130. The microscope also includes a tube lens 132 through which light passes from the objective lens 122 to a prism 134. The light passing through the prism 134 is split so that part of the light passing through the objective lens continues upward to the rest of the system 100 and part of the light goes to an eye piece filter 136 and to an eye piece 138 so that the device being tested may be viewed by a user.

Various types of optical lens systems are well known to those skilled in the art. Substantial IR background radiation may be generated by the room temperature optical elements themselves. The objective lenses 122 contribute to IR background noise. This noise is reduced by the IR filter inside the cooled system described below. Suitable materials for the lenses include zinc selenide (ZnSe), calcium fluoride ($CaF_2$), and zinc sulfide (ZnS), which are well known optical materials.

The Optical Filter Assembly

The light passing through the prism is received by an optical filter assembly 104. The optical filter assembly may be mounted onto the objective lens assembly. Band pass filters 140A, 140B are preferably contained in a filter wheel 142, which permits selective positioning of the band pass filters 140A, 140B.

The Spectrometer

The electromagnetic radiation from the device being viewed enters a demountable grating spectrometer 106. The light entering the grating spectrometer 106 is reflected by a folding mirror 150 to a spherical mirror 152. The spherical mirror 152 directs the light to a retractable grating 154 which further separates the light according to wavelength. The separated light is again sent to the spherical mirror 152. The spherical mirror 152 reflects the light to a mirror 156 which directs the separated wavelengths of light out of the demountable grating spectrometer 106 towards the beam splitter 108.

The spectrometer divides the light into three spectral bands, 200 nm–600 nm (ultraviolet), 600 nm–1000 nm (visible), and 1000 nm–2500 nm (infrared). The spectrometer is modular so that the imaging system may be operated in a photometric mode independently of the spectrometer. The order sorting filters (not shown) may be used to select different orders of gratings to provide different spectral characterizations for the ultraviolet, visible and infrared light. Also, laser alignment may be provided to align the spectrometer to the focal plane arrays.

The remaining elements of the multiwavelength imaging and spectroscopic photoemission microscope system 100 are contained in the dewar case 160 and maintained at a very low temperature in a manner described below.

The Beam Splitter

Electromagnetic radiation exiting the demountable grating spectrometer 106 passes into the dewar case 160 and is directed to the beam splitter 108. The beam splitter is preferably a dichroic mirror assembly, but may be any suitable optical splitting device such as a beam-splitting prism assembly and/or mirrors or combinations of these elements. The beam splitter splits the light so that IR spectrum light is directed to a first spectrum focal plane 110 and the optical spectrum light is directed to a second spectrum focal plane 112. Note that the spectrometer 106 may be omitted and the light may be separated by spectrum using the beam splitter.

The beam splitter is maintained at a very cold temperature in order to prevent background radiation in the IR spectrum. Thus, the beam splitter is located near the cryogenic container 116 so that heat from the beam splitter is transferred to liquid nitrogen (or other cold liquified gas) in the vessel. This reduces background noise and improves the signal-to-noise ratio.

The Infrared Focal Plane Array

Infrared light is directed from the beam splitter 108 to a plane mirror 171, which directs the IR light to the IR focal plane array 110 through the IR filter assembly 170. To minimize background radiation from the device being tested and to improve the signal-tonoise ratio of radiation emission measurements, the present invention preferably includes one or more band pass filters to eliminate undesirable electromagnetic energy wavelengths. For example, a band pass filter eliminating ultraviolet and optical light (200 nm–1000 nm) may be in place so that only infrared light passes the filter. Moreover, background radiation may be reduced through the band pass filters. Preferably, band pass filters having varying band pass characteristics are used. The band pass filters may be of any well known type of narrow-band filter.

The IR filter assembly 170 is preferably located near the cryogenic containers 116, 118 so that heat from the filters is transferred to the liquid nitrogen stored in the cryogenic containers. This reduces background radiation and improves the signal-to-noise ratio.

Infrared light passes through the filter assembly 170 and is received by an IR photodiode array detector 114A, such as the two dimensional array detector described in the '830 patent. As noted in the '830 patent, several types of commercially available array detectors are known and suitable for the present invention. Most preferable is a mercury cadmium telluride (HgCdTe) photodiode having a 256×256 pixel array. The infrared wavelength light incident on the photodiode 114A is converted into electronic information and analyzed in a well know manner by using electronics such as an electronic signal processor 200, described in the '830 patent.

The Visible Focal Plane Array

Visible light is transmitted through the filter assembly 104 via the beam splitter 108 and is focused onto a visible focal plane array 112. Preferably, the array includes a 512×512 silicon optical CCD 114B. The light incident to optical CCD 114B may be converted into electronic information and analyzed.

The Cryogenic Vessels

The dewar case 160 houses two cryogenic containers 116, 118. Because infrared radiation is heat, detection of infrared radiation is quite sensitive to background temperature. Thus, it is preferable that elements analyzing infrared radiation be maintained at a very low temperature. It is known that any object of a temperature greater than 0° Kelvin emits background radiation. It is believed that a semiconductor at room temperature (approximately 300° Kelvin) emits infrared radiation having a known spectral distribution. To reduce infrared background noise, it is desirable that the beam splitter 108, IR filter assembly 170, and both focal plane arrays 110, 112 be operated at a temperature of less than approximately 77° Kelvin. Thus, the beam splitter 108, IR filter assembly 170, and both focal planes 110, 112 are mounted inside the dewar case 160 on the base of the two cryogenic containers 116, 118 and maintained in a vacuum space below the dewar at a temperature of approximately 77° K.

The dewar case 160 includes an outer cryogenic vessel 118 having a fill port 180 and an inner cryogenic vessel 116 having a fill port 182. The fill ports 180, 182 provide the introduction of liquid nitrogen or other very cold liquified gas into the cryogenic vessels. A cold surface 190 is provided at the bottom of the dewar case 160 to aid in transferring heat from the vacuum space to the dewar.

Analysis of Data from the Focal Plane Arrays

The information from the IR photodiode 114A and optical CCD array 114B are provided to an electronic signal processor 200. Such a signal processor is fully disclosed in the '830 patent and is not described in detail here. The electronic signal processor 200 may, for example, amplify the information provided from the photodiode and CCD array and convert the signal from an analog to a digital format, and then multiplex the data using, for example, a time division multiplexer. The multiplexed data may be sent to a computer 202 or otherwise processed as digital information.

Conclusion

A device is disclosed for providing a broad wavelength electromagnetic radiation imaging of a device. Preferably, the wavelengths include the infrared and visible light spectra. This device preferably provides simultaneous imaging of both infrared and visible light emissions of an object being tested, such as a semiconductor. The present invention may be used in failure analysis of integrated circuits and in semiconductor and low temperature physics.

It is apparent to those skilled in the art that various modifications and variations can be made in the practice of the method or in the implementation of the system of the present invention without departing from the scope or spirit of the invention. For example, it is apparent to those skilled in the art that a closed cycle cooler can be substituted for the dewar and liquid nitrogen. Furthermore, the present invention can be used generally to detect defects in any type of microdevice that emits detectable electromagnetic radiation.

The above described embodiments of the invention are intended to be illustrative only. Numerous alternative embodiments may be devised by those skilled in the art without departing from the spirit and scope of the following claims.

I claim:

1. A multiwavelength imaging system, comprising:
   a. microscope configured to view electromagnetic radiation emitted from an object;
   b. a spectrometer configured to receive the electromagnetic radiation viewed by the microscope, and having a retractable grating configured to separate the received electromagnetic radiation according to wavelength into three separate spectral bands;
   c. a beam splitter configured to receive the electromagnetic radiation separated by the retractable grating and to direct infrared spectrum light to an infrared focal plane array and visible spectrum light to a visible focal plane array;
   d. the infrared focal plane array configured to receive infrared light from the beam splitter and to convert the infrared light into electronic information; and
   e. the visible focal plane array configured to receive visible light from the beam splitter and to convert the visible light into electronic information.

2. The system of claim 1, further comprising a cryogenic vessel configured to maintain the beam splitter and the infrared focal plane array at a very low temperature.

3. The system of claim 2, further comprising an infrared light band pass filter between the beam splitter and the infrared focal plane array and configured to filter the infrared light from the beam splitter and to direct the filtered light to the infrared focal plane array and the cryogenic vessel is configured to maintain the infrared light band pass filter at a very low temperature.

4. The system of claim 1, further comprising a visible light band pass filter between the microscope and the spectrometer and configured to filter the electromagnetic radiation viewed by the microscope and direct the filtered light to the spectrometer.

5. The system of claim 1, further comprising an infrared light band pass filter between the beam splitter and the infrared focal plane array and configured to filter the infrared light from the beam splitter and to direct the filtered light to the infrared light focal plane array.

6. A method for simultaneously obtaining images of a wide spectrum of electromagnetic radiation emitted by an object, the method comprising the steps of:
   a. receiving electromagnetic radiation emitted from the object;
   b. using a spectrometer having a retractable grating configured to separate the received electromagnetic radiation according to wavelength into three separate spectral bands including ultraviolet light, infrared light and visible light;
   c. directing the infrared light to an infrared focal plane array;
   d. directing the visible light to a visible focal plane array; and
   e. electronically processing outputs of the visible and infrared focal plane arrays.

7. The method of claim 6, further comprising the step of maintaining the infrared focal plane array at a very low temperature.

8. The method of claim 6, wherein the step of separating further comprises the step of using a beam splitter for separating the electromagnetic energy.

* * * * *